Patented Dec. 13, 1949

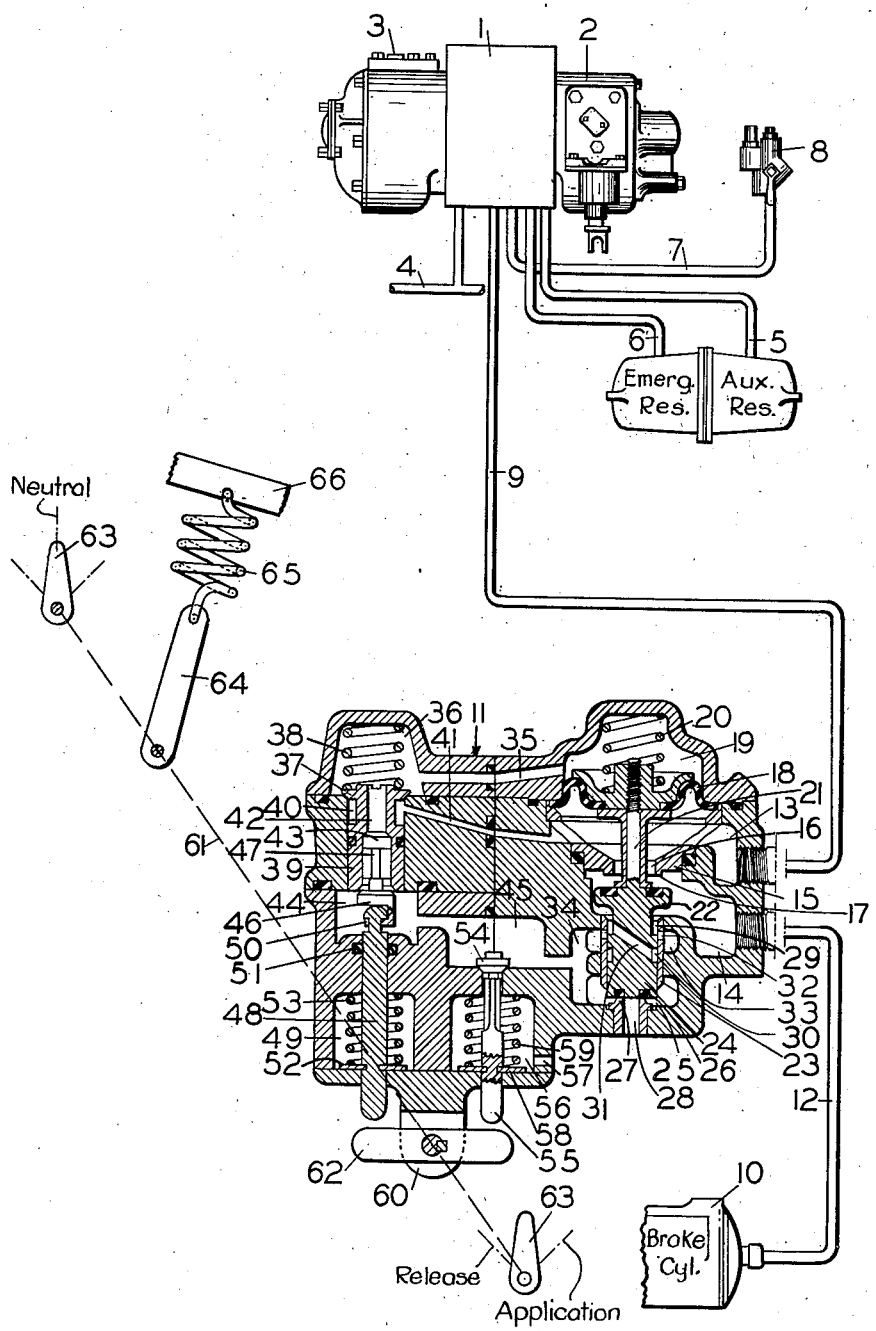

2,490,999

UNITED STATES PATENT OFFICE 2,490,999

FLUID PRESSURE CONTROL APPARATUS FOR CONTROLLING BRAKE CYLINDER PRESSURE

Everett P. Sexton, East McKeesport, Pa., assignor to The Westinghouse Air Brake Company, Wilmerding, Pa., a corporation of Pennsylvania Application October 18, 1947, Serial No. 780,680

8 Claims. (Cl. 303—68)

This invention relates to automatic fluid pressure brake equipment, such as the AB type, for use on railway vehicles and more particularly to means for releasing and reapplying the vehicle brakes by fluid under pressure when the brake pipe is completely vented.

When a vehicle provided with such equipment and having the reservoir or reservoirs thereof charged with fluid under pressure, is cut out of a train for switching operation, inspection of the brake equipment or the like, the brake pipe is completely vented and the brake controlling valve device will move to emergency position and establish communication between said reservoir or reservoirs and the brake cylinder device, whereupon the pressure of fluid in said reservoir will equalize into said brake cylinder device and effect an emergency application of brakes on the vehicle.

For moving a vehicle during switching operation it is desirable to release a brake application thus effected without, however, dissipating and wasting the fluid pressure remaining in the partly charged reservoir or reservoirs, so that when the vehicle is again connected into a train, less fluid under pressure and less time will be required to recharge the brake equipment, and this is very important, particularly when a number of vehicles are involved, in order to expedite movement of the train.

During switching operation of the vehicle there may however be times when it is desirable to apply the vehicle brakes with the brake pipe still vented, and while this can be accomplished by operation of the usual hand brake, it is nevertheless more desirable, where fluid under pressure is still stored in the partly charged reservoir or reservoirs, to employ this fluid for accomplishing this end. On the other hand, during yard inspection of railway vehicles it is necessary to apply the brakes on each individual vehicle by fluid under pressure to check the brake cylinder piston travel and then release the brake for adjusting, if necessary, such travel to within prescribed limits, and particularly if new shoes are required these operations may have to be repeated to obtain the desired adjustment. To expedite such inspection and adjustment it is therefore desirable, where fluid under pressure is still stored in the partly charged reservoir or reservoirs on the vehicle, to employ such fluid for operating the brake cylinder device to apply the brakes.

One object of the invention is therefore the provision of an improved brake release and application valve device arranged to be interposed in the pipe connecting the brake controlling valve device to the brake cylinder device, and adapted to be operated manually by a trainman, either while riding the vehicle or from the ground, and with the brake pipe completely vented, for releasing fluid under pressure from the vehicle brake cylinder device, without dissipating and wasting the fluid pressure remaining in the partly charged reservoir or reservoirs, and for employing this fluid under pressure in the reservoirs for reapplying the brakes on the vehicle if necessary or desired.

Another object of the invention is the provision of a brake release and application valve device, such as above defined, which is automatically operative upon recharging of the brake pipe and opening to atmosphere the brake cylinder connection at the brake controlling valve device, to reconnect the brake cylinder device, if not already connected, to the brake controlling valve device for insuring control of the brakes on the vehicle during subsequent operation of the vehicle in a train.

Before descending certain long dangerous grades, it is customary to vent the brake pipe on a train to effect an emergency application of brakes, and to then inspect the brake equipment on the vehicles through the train to make sure it is operating properly, and to also check on worn brake shoes to note if replacement is necessary. While this inspection is taking place the usual brake cylinder pressure retaining valve devices on the vehicles will be turned up for preventing the brake cylinder pressure reducing below a certain degree, such as ten pounds, during cycling operation on the descent of the grade. If the vehicles are equipped with a brake release and application valve device such as above described, these devices will be employed for releasing the brakes on individual cars to permit inspection, replacement of brake shoes, etc. In order to insure that the brakes on the vehicles will later apply when called upon to do so during the descent, it is therefore necessary to insure that any brake release and application valve device which may still be in its brake cylinder release position, positively and automatically return to its normal position in response to such recharge, even if the brake cylinder retaining valve device on the vehicle has in the meantime been turned up and will prevent a complete release of fluid pressure from the portion of the brake cylinder pipe connecting the brake controlling valve device on the vehicle to the respective brake release and application valve device.

Another object of the invention is therefore the provision of an improved brake release and application valve device such as above defined which, in case it is in the position opening the brake cylinder to atmosphere, will automatically operate to the position for connecting the brake controlling valve device to the brake cylinder device upon recharging the brake pipe, even with the usual brake cylinder pressure retaining valve device turned up for holding a chosen pressure of fluid in the brake cylinder device.

Other objects and advantages will become apparent from the following more detailed description of the invention.

In the accompanying drawing, the single figure is a diagrammatic view, partly in outline and partly in section, of a fluid pressure brake equipment embodying the invention.

Description

As shown in the drawing, 1 designates a pipe bracket of an AB control valve, the service portion is designated by 2 and the emergency portion by 3. 4 designates a brake pipe connected to the AB control valve and 5 and 6 designate pipes connecting respectively the auxiliary and emergency reservoirs to the AB control valve. 7 designates the brake cylinder release pipe connecting the AB control valve to a brake cylinder pressure retaining valve device 8 of usual structure. 9 designates the usual application and release or brake cylinder pipe connected to the AB control valve and adapted to be connected with the brake cylinder device 10.

All of the parts so far described are of known construction, the AB control valve being standard on American railroads.

The reference numeral 11 indicates a brake cylinder fluid pressure release and supply or application valve device embodying the invention, said device being interposed between the brake cylinder pipe 9 and a pipe 12 connected to the brake cylinder device 10.

The brake cylinder release and supply valve device 11 comprises a casing having two chambers 13 and 14 connected, respectively, to pipes 9 and 12. The chambers 13 and 14 are separated by a partition wall 15 having a central aperture 16 and an annular valve seat 17 surrounding said aperture and extending into chamber 14. The chamber 13 is formed at one side of a flexible diaphragm 18 while at the opposite side is a chamber 19 containing a spring 20 acting on said diaphragm urging it in the direction of chamber 13. The diaphragm 18 is arranged in coaxial relation to the aperture 16 and a stem 21 connected at one end to said diaphragm and extending through said aperture is connected in chamber 14 to a valve structure comprising a poppet valve 22 arranged to cooperate with the annular seat 17 for closing communication between chambers 13 and 14. Depending from the valve 22 and having sliding engagement within a bushing 23 secured in the casing is an integral slide valve 24 extending into a chamber 25 and provided therein on its lower end with a valve 26 arranged to cooperate with an annular casing seat 27 for controlling communication between chamber 25 and a passage 28 open to atmosphere.

The slide valve 24, which is annular in form, is provided with two spaced apart annular grooves 29 and 30 connected together by a diagonal passage 31, the groove 29 being constantly open to chamber 14. With the valve 26 seated and valve 22 open the groove 29 is open through one or more small ports 32 in the bushing 23 to an annular cavity 33 encircling said bushing. The cavity 33 is open through a passage 34 to chamber 25. With the valve 22 in contact with seat 17, the valve 26 will be unseated, and in this position of the slide valve 24 the ports 32 will be open to cavity 30 in said slide valve. As the slide valve 22 is moved from its normal position, in which it is shown in the drawing, to a brake release position defined by contact with seat 17 the annular groove 29 will be disconnected from ports 32 before said ports are opened to groove 30.

The diaphragm chamber 19 is open through a passage 35 to a chamber 36 containing a valve 37 and a spring 38 acting to urge said valve into contact with a seat on the casing. The valve 37 is provided on one end of a plunger 39 slidably mounted in a suitable bore in the casing and having adjacent said valve an annular cavity 40 open through a passage 41 to chamber 13 below the diaphragm 18. An axial bore 42 provided in valve 47 and a portion of plunger 39 is open at one end to chamber 36 and at its opposite end to a bore 43 of larger diameter extending through said plunger and opening to a chamber 44 at the end of plunger 39 opposite the valve 37.

The chamber 44 is open through a communication including a chamber 45 to passage 34 in turn open to chamber 25 containing the valve 26. A release valve 46 contained in chamber 44 and having a fluted stem 47 slidably mounted in bore 43 is provided for co-operation with a seat on the adjacent end of plunger 39 for controlling communication between chamber 44 and chamber 36. A pin 48 slidably mounted in suitable bores in the casing at opposite side of a chamber 49 has one end disposed in chamber 44 in coaxial relation to valve 46 while the opposite end is disposed outside of the casing. The valve 46 has a projecting hook 50 disposed in an anular recess in the adjacent end of stem 48 connecting said valve for movement with said stem. A ring seal 51 disposed in an annular groove in the casing has sealing and sliding contact with the pin 48 for preventing leakage of fluid under pressure from chamber 44 to chamber 49. A washer 52 contained in chamber 49 and connected to the pin 48 is engaged by one end of a spring 53 the opposite end of which is supported on the casing, said spring being under pressure for urging said washer and thereby said pin to the position in which they are shown in the drawing in which the valve 46 is open and the valve 37 closed.

A valve 54 contained in chamber 45 has a stem 55 extending through bores in the casing at opposite sides of a chamber 56 to the exterior of the casing. Chamber 56 is open to atmosphere through a passage 57. The portion of stem 55 extending from valve 54 into chamber 56 is fluted to permit flow of fluid under pressure from chamber 45 to chamber 56 when said valve is open. A washer 58 disposed in chamber 56 is secured to the stem 55 and is subject to pressure of one end of a spring 59, the opposite end of which is supported by the casing, for urging said valve to a seated position.

The ends of pin 48 and valve stem 55 disposed outside of the casing are arranged in spaced apart parallel relation at either side of a casing lug 60 through which extends a shaft 61. A lever 62 is secured at its center to the shaft 61 and the opposite ends of said lever are provided for engagement with, respectively, the pin 48 and stem 55. The shaft 61 is adapted to extend to opposite sides of the vehicle and on each of its opposite ends there is provided a manually operative handle 63.

The two handles 63 are preferably arranged for operation by a trainman either while riding the vehicle or from the ground, said handles having a neutral position in which they are shown in the drawing, and release and application positions at, respectively, the opposite sides of neutral position. A centering lever 64 having one end connected to the shaft 61 has its opposite end connected to one end of a centering spring 65. The opposite end of spring 65 is anchored to any fixed part 66 of the vehicle, said spring being under tension for operating lever 64 to urge the shaft 61, the lever 62 and the two operating handles 63 to their neutral position, in which they are shown in the drawing.

*Operation*

In operation, let it be assumed that the two handles 63 and thereby the shaft 61 and lever 62 are in their neutral position under the tension of spring 65. The valve 54 will therefore be seated by spring 59, the valve 46 unseated by spring 53 and the valve 37 seated by spring 38. With the valve 46 unseated chamber 19 above the diaphragm 18 will be open past said valve to chamber 44 and thence through chamber 45 and passage 34 to ports 32 in bushing 23. With the AB control valve in its release position the brake cylinder pipe 9 will be open to atmosphere as well as the connected chamber 13 which will permit spring 20 to hold the diaphragm 18 in the position in which it is shown in the drawing, unseating the valve 22 and closing the valve 26. With the valves 22 and 26 and thereby the slide 24 thus conditioned, ports 32 and diaphragm chamber 19 will be open through the annular groove 29 to chamber 14, and said chambers and the brake cylinder device 10 will be open to chamber 13 and thence through the brake cylinder pipe 9 to atmosphere.

Now assume that the brake equipment has been fully charged with fluid under pressure following which brake pipe 4 is vented to atmosphere, as in setting the car out of a train. The auxiliary and emergency reservoir will thereby be opened to pipe 9 and pressure of fluid in said reservoirs will equalize through said pipe into chamber 13 and thence past the open valve 22 and through pipe 12 into the brake cylinder device 10 for applying the brakes on the vehicle in emergency. As fluid under pressure is thus supplied from the auxiliary and emergency reservoirs to the brake cylinder device 10 fluid will flow from chamber 14 through the annular groove 29 and ports 32 to the annular cavity 33 and thence through passage 34, chamber 45, valve chamber 44, past the open valve 46 to chamber 36, and thence through passage 35 into chamber 19, the pressure in the latter chamber thus building up sufficiently fast with respect to the rate of increase in pressure in chamber 13 by the supply of fluid under pressure from the auxiliary and emergency reservoirs to enable spring 20 to hold the diaphragm 18 in the position in which it is shown in the drawing unseating the valve 22 and closing the valve 26.

If the operator now desires to release fluid under pressure from the brake cylinder 10 without dissipating the fluid under pressure still remaining in the auxiliary and emergency reservoirs, he will operate either handle 63 to its release position for thereby actuating shaft 61 and lever 62 to unseat valve 54 against spring 59. Upon thus opening of valve 54 fluid under pressure will be vented from diaphragm chamber 19 through passage 35, chamber 36, past the open valve 46 to chamber 44, and thence through chamber 45 and past the open valve 54 to chamber 56 and atmosphere through passage 57, at a rate so exceeding the rate of supply to said chambers by flow through the ports 32, as to reduce the pressure in chamber 19 sufficiently to permit pressure of fluid in chamber 13 to deflect said diaphragm in an upwardly direction against spring 20 for pulling valve 22 into contact with its seat 17 and for at the same time opening valve 26. As the valve 26 opens, the slide valve 24 will close communication between the annular groove 29 in said slide valve and the ports 32 for temporarily preventing further flow of fluid under pressure from chamber 13 to passage 34 and thereby to chambers 45, 44, 36 and 19, whereupon a rapid dissipation of fluid from diaphragm chamber 19 will occur to insure prompt and full upward deflection of diaphragm 18 for seating valve 22 and opening fully the valve 26. When the valve 22 becomes seated against the rib 17, cutting off further flow of fluid under pressure from the auxiliary and emergency reservoirs to chamber 13 and thus to the brake cylinder device 10, said brake cylinder device and chamber will be opened to atmosphere through the annular groove 29, the diagonal passage 31, the annular groove 30, ports 32, annular cavity 33, passage 34 and vent port 28 opened by unseating of the valve 26, whereby the fluid under pressure in the brake cylinder device will be dissipated to atmosphere, without dissipating the fluid pressure remaining in the auxiliary and emergency reservoirs. The flow capacity of ports 32 is so related to the venting capacity of valve 26 that no material increase in pressure will occur in diaphragm chamber 19 during the release of fluid under pressure from the brake cylinder device, so that during, as well as after, such release, the valve 26 will remain open and the valve 22 closed due to pressure of fluid in chamber 13 on diaphragm 18.

After the valve 26 is opened in response to movement of either of the handles 63 to its release position, as above described, said handle may be released to permit return thereof and thereby of shaft 61 and lever 62 to their neutral position by the centering spring 65. The valve 54 will be promptly seated by spring 59 as the lever 62 returns to its neutral position, but this will be without effect at this time since valve 26 is open for holding chamber 19 vented.

With the brakes on the vehicle released and the auxiliary and emergency reservoirs still partly charged with fluid under pressure, if the operator desires to reapply the brakes by such fluid he will operate either handle 63 to its application position against the tension of centering spring 65. As a result, the lever 62 will be rotated in a clockwise direction to actuate pin 48 to move the valve 46 into contact with the end of plunger 39 and to then actuate said plunger to unseat the valve 37.

When the valve 37 is thus unseated fluid from the auxiliary and emergency reservoirs present in chamber 13 will flow therefrom through passage 41 to chamber 36 and then through passage 35 to chamber 19 and equalize on opposite sides of the diaphragm 18. When the pressure of fluid in chamber 19 is thus sufficiently increased the spring 20 will deflect diaphragm 18 and actuate stem 21 to open the valve 22 and close the valve 26. With the valve 22 thus open fluid under pressure from the auxiliary and emergency reservoirs will equalize past said valve into the brake cylinder device 10 for reapplying the brakes. The operator may then release the operating handle 63 whereupon it and the shaft 61 and lever 62 will be returned to their neutral position by centering spring 65. As the lever 62 is thus returned to its neutral position spring 38 will close valve 37 and spring 53 will open valve 46 thereby reestablishing communication between the diaphragm chamber 19 and chamber 44 which now is open through ports 32 in bushing 23 and the annular groove 29 in the slide valve 24 to chamber 14 now supplied with fluid under pressure from the auxiliary and emergency reservoirs, whereby the pressure of fluid on opposite sides of diaphragm 18 will remain equalized and spring 20 will maintain the valve 22 open and the valve 26 closed.

With the brakes thus reapplied, if the operator desires to again release the brakes on the vehicle he will again turn an operating handle 63 to its release position whereupon the release and application valve device 11 will again operate in the same manner as before described to open the brake cylinder 10 to atmosphere past the valve 26 for releasing the vehicle brakes. If subsequently the operator desires to reapply the brakes he need only move an operating handle 63 to its application position whereupon the brake release and application valve device 11 will again operate as above described to reestablish communication between the auxiliary and emergency reservoirs and the brake cylinder device 10 for reapplying the brakes. The brakes may be thus released and reapplied by fluid under pressure from the auxiliary and emergency reservoirs as long as the pressure of such fluid remains sufficient for actuating the brake cylinder device 10.

It will now be seen that after a car is set out of a train and the brake pipe 4 is completely vented for effecting an emergency application of brakes on the vehicle, the brakes may be released and subsequently reapplied by fluid under pressure remaining in the auxiliary and emergency reservoirs, merely by turning an operating handle 63 to the proper position.

If the brake release and application valve device 11 should be in its brake release position, in which the valve 22 is closed and the valve 26 open, at the time the car is cut into a train and the brake pipe is recharged, the operation of the AB control valve in response to such recharging will open the brake cylinder pipe 9 to pipe 7 and thence to atmosphere through the retaining valve device 8 in the usual manner, whereupon fluid pressure remaining in diaphragm chamber 13 will be dissipated to atmosphere. When this occurs spring 20 will deflect the diaphragm 18 to reopen the valve 22 and close the valve 26 for thereby reestablishing communication between the AB control valve and the brake cylinder device 10, so that the brakes on the vehicle will apply upon a subsequent reduction in pressure in brake pipe 4, in the usual manner. In case the retaining valve device 8 is adjusted for retaining a certain pressure of fluid in the brake cylinder device and thereby in pipe 9 at the time the brake pipe 4 is recharged and pipe 9 is opened to the retaining valve device, the spring 20 will deflect the diaphragm 18 to open valve 22 and close valve 26 against the pressure retained in diaphragm chamber 13.

Summary

It will now be seen that I have provided an improved brake application and release valve device which with the brake pipe completely vented may be operated by a trainman for releasing the brakes on the vehicle without dissipating the fluid pressure remaining in the auxiliary and emergency reservoirs at the time, and which may be operated to reapply the brakes on the vehicle by such fluid under pressure, and which is automatically operative upon connecting the vehicle into a train and recharging of the brake pipe 4 to reconnect the brake cylinder device 10 to the AB control valve even with the retaining valve device on the car adjusted to retain a certain pressure of fluid in the brake cylinder device.

Having now described the invention, what I claim as new and desire to secure by Letters Patent is:

1. A brake release and application valve device for use with a vehicle fluid pressure brake equipment of the type comprising at least one normally charged fluid pressure storage reservoir, a brake application and release pipe, a second pipe to which fluid under pressure is adapted to be supplied from said brake application and release pipe to effect an application of brakes on the vehicle and from which fluid under pressure is adapted to be released to effect a release of said brakes, and a brake controlling valve device operative to establish communication between said reservoir and said brake application and release pipe, said brake release and application valve device comprising a valve structure having a normal position for establishing communication between said brake application and release pipe and said second pipe, and having a brake release position for closing said communication and for opening said second pipe to atmosphere, movable abutment means connected to said valve means and operative by pressure of fluid from said brake application and release pipe upon release of an opposing fluid pressure to move said valve structure to said brake release position, spring means operative upon a chosen increase in said opposing fluid pressure with respect to the pressure in said brake application and release pipe to move said valve means to said normal position, means operative upon supply of fluid under pressure to said brake application and release pipe to provide said opposing fluid pressure, valve means for releasing said opposing fluid pressure, other valve means for restoring said opposing fluid pressure, and manually operative means for operating both of said valve means.

2. A brake release and application valve device for use with a vehicle fluid pressure brake equipment of the type comprising at least one normally charged fluid pressure storage reservoir, a brake application and release pipe, a second pipe to which fluid under pressure is adapted to be supplied from said brake application and release pipe to effect an application of brakes on the vehicle and from which fluid under pressure is adapted to be released to effect a release of said brakes, and a brake controlling valve device operative to establish communication between said reservoir and said brake application and release pipe, said brake release and application valve device comprising a valve structure having a normal position for establishing communication between said brake application and release pipe and said second pipe, and having a brake release position for closing said communication and for opening said second pipe to atmosphere, movable abutment means connected to said valve means and operative by pressure of fluid from said brake application and release pipe upon release of an opposing fluid pressure to move said valve structure to said brake release position, spring means operative upon a chosen increase in said opposing fluid pressure with respect to the pressure in said brake application and release pipe to move said valve means to said normal position, means operative upon supply of fluid under pressure to said brake application and release pipe to provide said opposing fluid pressure, valve means for releasing said opposing fluid pressure, other valve means for restoring said opposing fluid pressure, actuating means for selectively operating the two valve means, and a manually operable member for actuating said actuating means.

3. A brake release and application valve device for use with a vehicle fluid pressure brake equipment of the type comprising at least one normally charged fluid pressure storage reservoir, a brake application and release pipe, a second pipe to which fluid under pressure is adapted to be supplied from said brake application and release pipe to effect an application of brakes on the vehicle and from which fluid under pressure is adapted to be released to effect a release of said brakes, and a brake controlling valve device operative to establish communication between said reservoir and said brake application and release pipe, said brake release and application valve device comprising movable abutment means subject to pressure of fluid in said brake application and release pipe and an opposing fluid pressure, spring means, a valve device operative by said spring means to a normal position to establish a fluid flow communication from said brake application and release pipe to said second pipe and to provide said opposing fluid pressure, and operative by pressure of fluid from said brake application and release pipe upon release of said opposing fluid pressure to a brake release position for closing communication between said brake application and release pipe and said second pipe and for opening said second pipe to atmosphere, valve means for dissipating said opposing fluid pressure, other valve means for providing said opposing fluid pressure, and manual means for selectively operating both of said valve means.

4. A brake release and application valve device for use with a vehicle fluid pressure brake equipment of the type comprising at least one normally charged fluid pressure storage reservoir, a brake application and release pipe, a second pipe to which fluid under pressure is adapted to be supplied from said brake application and release pipe to effect an application of brakes on the vehicle and from which fluid under pressure is adapted to be released to effect a release of said brakes, and a brake controlling valve device operative to establish communication between said reservoir and said brake application and release pipe, said brake application and release valve device comprising valve means having a normal position for opening said application and release pipe to said second pipe and a brake release position for disconnecting said second pipe from said application and release pipe and for opening said second pipe to atmosphere, movable abutment means connected to said valve means subject to pressure of fluid in said application and release pipe and opposing pressure of fluid in a chamber and operative upon release of said opposing fluid pressure to move said valve means to said second position, spring means for moving said valve means to said normal position upon supply of fluid under pressure to said chamber, said valve means in said normal position establishing a communication for supplying fluid under pressure from said application and release pipe to said chamber and in said second position closing such communication, valve means for releasing fluid under pressure from said chamber at a rate exceeding the rate of supply through the last named communication, valve means for supplying fluid under pressure to said chamber, and means for selectively operating the last two named valve means.

5. A brake release and application valve device for use with a vehicle fluid pressure brake equipment of the type comprising at least one normally charged fluid pressure storage reservoir, a brake application and release pipe, a second pipe to which fluid under pressure is adapted to be supplied from said brake application and release pipe to effect an application of brakes on the vehicle and from which fluid under pressure is adapted to be released to effect a release of said brakes, and a brake controlling valve device operative to establish communication between said reservoir and said brake application and release pipe, said brake release and application valve device comprising valve means having a normal position for opening said application and release pipe to said second pipe and to a control communication, and having a second position for disconnecting said application and release pipe from said second pipe and control communication and for opening said control communication and second pipe to atmosphere, movable abutment means connected to said valve means subject to pressure of fluid in said application and release pipe and opposing pressure of fluid in a control chamber and operative upon release of fluid under pressure from said chamber to move said valve means to said second position, spring means for moving said valve means to said normal position upon supply of fluid under pressure to said chamber, a second valve means normally opening said control communication to said chamber and operative to disconnect said chamber from said control communication and open said chamber to said application and release pipe, a third valve means for venting fluid under pressure from said control communication, and means for selectively operating said second valve means and said third valve means.

6. A brake release and application valve device for use with a vehicle fluid pressure brake equipment of the type comprising at least one normally charged fluid pressure storage reservoir, a brake application and release pipe, a second pipe to which fluid under pressure is adapted to be supplied from said brake application and release pipe to effect an application of brakes on the vehicle and from which fluid under pressure is adapted to be released to effect a release of said brakes, and a brake controlling valve device operative to establish communication between said reservoir and said brake application and release pipe, said brake application and release valve device comprising valve means having a normal position for opening said application and release pipe to a second pipe and a second position for opening said second pipe to atmosphere, spring means for actuating said valve means to said normal position, fluid pressure responsive means for actuating said valve means to said second position, a second valve means having a normal position for cooperation with the first named valve means in its normal position to supply fluid under pressure to said fluid pressure responsive means and in the second position of said first named valve means to release fluid under pressure from said fluid pressure responsive means, said second valve means in another position closing communication between said first named valve means and opening a communication for supplying fluid under pressure from said application and release pipe to said fluid pressure responsive means, a third valve means for releasing fluid under pressure from said fluid pressure responsive means, and manual means for selectively operating said second and third valve means.

7. A brake release and application valve device for use with a vehicle fluid pressure brake equipment of the type comprising at least one normally charged fluid pressure storage reservoir, a brake application and release pipe, a second pipe to which fluid under pressure is adapted to be supplied from said brake application and release pipe to effect an application of brakes on the vehicle an from which fluid under pressure is adapted to be released to effect a release of said brakes, and a brake controlling valve device operative to establish communication between said reservoir and said brake application and release pipe, said brake release and application valve device comprising valve means having a normal position for opening said application and release pipe to said second pipe and to a chamber and a brake release position for closing communication between said application and release pipe and said second pipe and chamber and for opening said second pipe and chamber to atmosphere, movable abutment means subject to pressure of fluid in said application and release pipe and opposing pressure of fluid in another chamber and operative upon release of fluid under pressure from said other chamber to move said valve means to said brake release position, spring means for moving said valve means to said normal position upon supply of fluid under pressure to said other chamber, a second valve means having a normal position for opening said other chamber to the first named chamber and another position for closing such communication and for opening said other chamber to said application and release pipe, a third valve means for opening the first named chamber to atmosphere, and manually operative means for selectively moving said second valve means to its other position and for actuating said third valve means.

8. The combination with a fluid pressure controlled device and a device for controlling supply and release of fluid under pressure to and from said fluid pressure controlled device, of a valve device controlling the fluid pressure supply and release communication between the first two named devices comprising valve means having a normal position for establishing said communication and a second position for closing said communication and for releasing fluid under pressure from said fluid pressure controlled device, fluid pressure means operable upon supply of fluid under pressure to a chamber to move said valve means to said normal position and upon release of fluid under pressure from said chamber to move said valve means to said second position, a second valve means for supplying fluid under pressure to said chamber, a third valve means for releasing fluid under pressure from said chamber, actuating means for selectively operating said second and third valve means, and a manually operable member for operating said actuating means.

EVERETT P. SEXTON.

REFERENCES CITED

The following references are of record in the file of this patent:

UNITED STATES PATENTS

| Number | Name | Date |
|---|---|---|
| 1,464,640 | Breck et al. | Aug. 14, 1923 |
| 2,408,129 | Sudduth | Sept. 24, 1946 |